(12) United States Patent
Yoon

(10) Patent No.: US 6,526,675 B1
(45) Date of Patent: Mar. 4, 2003

(54) METHODS OF USING NATURAL PRODUCTS AS DEWATERING AIDS FOR FINE PARTICLES

(76) Inventor: Roe-Hoan Yoon, 2909 Wakefield Dr., Blacksburg, VA (US) 24060

( * ) Notice: Subject to any disclaimer, the term of this patent is extended or adjusted under 35 U.S.C. 154(b) by 0 days.

(21) Appl. No.: 09/326,330

(22) Filed: Jun. 7, 1999

(51) Int. Cl.$^7$ .............................. F26B 7/00; B01D 24/46
(52) U.S. Cl. .............................. 34/424; 34/334; 34/338; 34/340; 34/349; 34/380; 34/397; 210/770; 210/772; 210/771; 530/344; 530/345; 530/410; 530/419
(58) Field of Search .................... 34/334, 338, 339, 34/340, 348, 349, 380, 397, 423, 424; 210/725, 727, 728, 729, 732, 770, 772, 777, 778, 771; 530/344, 345, 374, 410, 419, 427, 303, 305

(56) References Cited

U.S. PATENT DOCUMENTS

| | | | |
|---|---|---|---|
| 1,064,723 A | | 6/1913 | Greenway et al. |
| 1,102,873 A | | 7/1914 | Chapman et al. |
| 1,208,171 A | | 12/1916 | Lavers et al. |
| 2,120,217 A | | 6/1938 | Harris |
| 2,864,765 A | | 12/1958 | Stoneman et al. |
| 3,880,824 A | * | 4/1975 | Rao et al. .................... 260/112 |
| 4,039,466 A | | 8/1977 | Matsuda et al. |
| 4,156,649 A | | 5/1979 | Quinn et al. |
| 4,191,655 A | | 3/1980 | Quinn et al. |
| 4,206,063 A | | 6/1980 | Wang et al. |
| 4,207,186 A | | 6/1980 | Wang et al. |
| 4,210,531 A | | 7/1980 | Wang et al. |
| 4,278,208 A | | 7/1981 | Falcon-Steward |
| 4,410,431 A | | 10/1983 | Roe |
| 4,447,344 A | | 5/1984 | Roe |
| 4,507,198 A | | 3/1985 | Unger et al. |
| 4,561,953 A | | 12/1985 | Muralidhara et al. |
| 4,770,766 A | | 9/1988 | Keller, Jr. et al. |
| 4,866,856 A | * | 9/1989 | Feeley .......................... 34/340 |
| 4,969,928 A | | 11/1990 | Wen et al. |
| 5,011,612 A | | 4/1991 | Keeney |
| 5,048,199 A | | 9/1991 | Cole |
| 5,161,694 A | | 11/1992 | Yoon et al. |
| 5,167,831 A | | 12/1992 | Diamas |
| 5,215,669 A | | 6/1993 | Koester et al. |
| 5,256,169 A | | 10/1993 | Roe |
| 5,283,322 A | * | 2/1994 | Martin et al. ................ 530/374 |
| 5,346,630 A | | 9/1994 | Kenney |
| 5,379,902 A | | 1/1995 | Wen et al. |
| 5,405,554 A | | 4/1995 | Neff et al. |
| 5,458,786 A | | 10/1995 | Yoon et al. |
| 5,544,760 A | | 8/1996 | Benn et al. |
| 5,587,786 A | | 12/1996 | Yoon et al. |
| 5,670,056 A | * | 9/1997 | Yoon et al. .................. 210/728 |
| 5,700,904 A | * | 12/1997 | Baker et al. ................. 530/305 |
| 5,814,210 A | | 9/1998 | Yoon et al. |

OTHER PUBLICATIONS

Laiqun Mao and Roe–Hoan Yoon, "Predicting flotation rates using a rate equation derived from first principles" 1997, International Journal of Mineral Processing, 51, pp. 171–181.

Roe–Hoan Yoon and B. Suha Aksoy, "Hydrophobic Forces in Thin Water Films Stabilized by Dodecylammonium Chloride" 1999, Journal of Colloid and Interface Science, 211, pp. 1–10.

Flinn, D.H., Guzonas, D.A. and Yoon, R.–H., Colloids and Surfaces A, vol. 87, pp. 163–176, 1994.

Groppo, J.G. and Parekh, B.K., "Surface Chemical Control of Ultra–Fine Coal to Improve Dewatering," Coal Preparation, vol. 17, pp. 103–116, 1996.

Singh, B.P., "The Influence of Surface Phenomena on the Dewatering of Fine Clean Coal," Filtration and Separation, pp. 159–163, Mar. 1977.

Yoon, R.–H. and Ravishankar, S.A., "Long–Range Hydrophobic Forces between Mica Surfaces in Dodecylammonium Chloride Solutions in the Presence of Dodecanol," J. Colloid and Interface Science, vol. 179, pp. 391–402, 1996.

* cited by examiner

*Primary Examiner*—Pamela Wilson
(74) *Attorney, Agent, or Firm*—Grossman Tucker Perreault & Pfleger

(57) ABSTRACT

A method of dewatering fine particulate materials is disclosed. In this method, an aqueous slurry of fine particles is treated with appropriate hydrophobizing reagents so that the particulate material becomes moderately hydrophobic. A lipid of vegetable or animal origin is then added to the slurry in solutions of light hydrocarbon oils and short-chain alcohols, so that the hydrophobic lipid molecules adsorb on the moderately hydrophobic surface and, thereby, greatly enhance its hydrophobicity. By virtue of the enhanced hydrophobicty, the water molecules adhering to the surface are destabilized and more readily removed during the process of mechanical dewatering. The moisture reduction can be further improved using appropriate electrolytes in conjunction with the lipids, spraying surface tension lowering reagents onto the filter cake, subjecting the cake to a suitable vibratory means, and using combinations thereof.

51 Claims, No Drawings

METHODS OF USING NATURAL PRODUCTS AS DEWATERING AIDS FOR FINE PARTICLES

BACKGROUND

Many particulate materials are produced and processed in aqueous media. Before they are sold to customers or further processed, it is often necessary to remove the water. Dewatering can be achieved by either mechanical methods (e.g., filtration and centrifugation) or thermal drying. In general, the former is cheaper than the latter. However, mechanical dewatering becomes inefficient with finer particles. Dewatered products contain high moistures, often requiring thermal drying to meet specifications.

In a given mechanical dewatering process, bulk of the water is removed rather quickly. What is difficult to remove is the water adhering to the surface of the particulate material. Thus, the amount of the residual water left in the product is approximately proportional to its surface area. For a given material, specific surface area is inversely proportional to the square of its particle size. Therefore, the residual moistures in filtered products increase accordingly with decreasing particle size. A more quantitative explanation for the difficulty in dewatering fine particles by filtration may be given by the Laplace equation:

$$\Delta p = \frac{2\gamma\cos\theta}{r}, \quad [1]$$

in which $\Delta p$ is the pressure of the water inside a capillary (formed between the particles present in a filter cake), r is the capillary radius, $\gamma$ is the surface tension of water, and $\theta$ is the contact angle of the particles in the cake. The contact angle is a measure of the hydrophobicity (water-hating property) of the particles. Eq. [1] shows that the pressure required to blow the water out of a capillary increases with decreasing capillary radius. Considering that finer particles form smaller capillaries, one can see the difficulty in dewatering fine particles. With a given filter cake, which consists of particles of different sizes, there must be a distribution of capillaries of various radii. At a given pressure drop applied across a filter cake, it would be difficult to blow the water out of the capillaries whose radii are below certain critical value. Thus, the number of capillaries, whose radii are below the critical radius, should determine the final cake moisture.

Various polymeric flocculants are used to enlarge the particle size and, hence, minimize the number of smaller capillaries. Electrolytic coagulants can also be used to enlarge particles. Groppo and Parekh (Coal Preparation, 1996, vol. 17, pp. 103–116) showed that fine coal dewatering improves considerably in the presence of divalent and trivalent cations. They found this to be the case when using cationic, anionic and nonionic surfactants.

Eq. [1] suggests also that capillary pressure should decrease with decreasing surface tension and increasing contact angle. Various surfactants are used to decrease the surface tension. Most of the dewatering aids used for this purpose is ionic surfactants with high hydrophile-lipophile balance (HLB) numbers. Sodium laurylsulfate and sodium dioctylsulfosuccinate, whose HLB numbers are 40 and 35.3, respectively, are typical examples. Singh (Filtration and Separation, March, 1977, pp. 159–163) suggested that the former is an ideal dewatering aid for coal because it does not adsorb on the surface, which in turn allows for the reagents to be fully utilized in lowering surface tension. The U.S. Pat. No. 5,346,630 teaches a method of pressure spraying a solution of a dewatering aid from a position within the filter cake forming zone of a filter just prior to the disappearance of the supernatant process water. This method, which is referred to as torpedo-spray system, ensures even distribution of the dewatering aid without becoming significantly diluted by the supernatant process water.

It is well known that high HLB surfactants can actually cause an increase in moisture in dewatering hydrophobic materials such as coal. Due to the high polarity of its head group, high HLB surfactants adsorb on hydrophobic surfaces with inverse orientation, i.e., with hydrocarbon tails in contact with the surface and the polar heads pointing toward the aqueous phase. Such an adsorption mechanism should decrease the hydrophobicity and, hence, cause an increase in cake moisture. Most of the flocculants used as dewatering aids also dampen the hydrophobicity, and cause an increase in moisture.

There are several U.S. patents, which disclosed methods of using low HLB surfactants as dewatering aids. The U.S. Pat. Nos. 4,447,344 and 4,410,431 disclosed methods of using water insoluble nonionic surfactants with their HLB numbers in the range of 6 to 12. These reagents were used together with reagents (hydrotropes) that are capable of keeping the surfactants in solution or at the air-water interface rather than at the solid-liquid interface, so that they can be fully utilized in lowering surface tension. The advantage of using low HLB surfactants may be that unlike the high HLB surfactants they do not have the deleterious effects of hydrophobicity dampening.

The U.S. Pat. No. 5,670,056 teaches a method of using non-ionic low HLB surfactants and polymers as hydrophobizing agents that can increase the contact angle above 65° and, thereby, reduce the cake moisture. Monounsaturated fatty esters, fatty esters whose HLB numbers are less than 10, and water-soluble polymethylhydrosiloxanes were used as hydrophobizing agents. The fatty esters were used with or without using butanol as a carrier solvent for the low-HLB surfactants. This invention disclosure lists a group of particulate materials that can be dewatered using these reagents. These include coals, clays, sulfide minerals, phosphates, metal oxide minerals, industrial minerals and waste materials, most of which are hydrophilic. The use of the low HLB surfactants disclosed in the U.S. Pat. No. 5,670,056 may be able to increase the contact angles of the materials that are already hydrophobic but not for the hydrophilic particles.

The U.S. Pat. No. 2,864,765 teaches a method of using a polyoxyethylene ehter of a hexitol anhydride partial long chain fatty acid ester, functioning alone or as a solution in kerosene. However, the disclosure does not mention that the nonionic surfactant increases the hydrophobicity of moderately hydrophobic particles. Furthermore, the compounds disclosed are essentially not adsorbed upon the solid surface of the ore particles and remain in the filtrate, as noted in the U.S. Pat. No. 4,156,649. In the latter patent and also in the U.S. Pat. No. 4,191,655, methods of using linear or branched alkylethoxylated alcohols as dewatering aids were disclosed. They were used in solutions of hydrocarbon solvents but in the presence of water-soluble emulsifiers such as sodium dioctylsulfosuccinate. As has already been discussed, the use of such a high HLB surfactant can dampen the hydrophobicity and cause an increase in moisture.

The U.S. Pat. No. 5,048,199 disclosed a method of using a mixture of a non-ionic surfactant, a sulfosuccinate, and a deforming agent. The U.S. Pat. No. 4,039,466 disclosed a method of using a combination of nonionic surfactant having a polyoxyalkylene group and an anionic surfactant. The U.S. Pat. No. 5,215,669 teaches a method of using water-soluble mixed hydroxyether, which is supposed to work well on both hydrophobic (coal) and hydrophilic (sewage sludge) materials. The U.S. Pat. No. 5,167,831 teaches methods of using non-ionic surfactants with HLB numbers of 10 to 14. This process is useful for dewatering Bayer process alumina trihydrate, which is hydrophilic. The U.S. Pat. No. 5,011,612 disclosed methods of using $C_8$ to $C_{20}$ fatty acids, fatty acid precursors such as esters or amides, or a fatty acid blend. Again, these reagents are designed to dewater hydrophilic alumina trihydrate.

The U.S. Pat. No. 4,206,063 teaches methods of using a polyethylene glycol ether of a linear glycol with its HLB number in the range of 10 to 15 and a linear primary alcohol ethoxylate containing 12 to 13 carbon atoms in the alkyl moiety. These reagents were used to dewater mineral concentrates in conjunction with hydrophobic alcohols containing 6 to 24 carbon atoms. The composition of this invention was preferably used in conjunction with polymeric flocculants. Similarly, the U.S. Pat. No. 4,207,186 disclosed methods of using a hydrophobic alcohol and a non-ionic surfactant whose HLB number is in the range of 10 to 15.

It is well known that oils can enhance the hydrophobicity of coal, which is the reason that various mineral oils are used as collectors for coal flotation. The U.S. Pat. No. 4,210,531 teaches a method of dewatering mineral concentrates using a polymeric flocculant, followed by a combination of an anionic surfactant and a water-insoluble organic liquid. The use of flocculant and ionic surfactants may be beneficial in dewatering, but they could dampen the hydrophobicity of the particles and, hence, adversely affect the process. The U.S. Pat. No. 5,256,169 teaches to treat a slurry of fine coal with an emulsifiable oil in combination with an elastomeric polymer and an anionic and nonionic surfactant, dewatering the slurry and drying the filter cake, where the oil reduces the dissemination of fugitive dusts. The U.S. Pat. No. 5,405,554 teaches a method of dewatering municipal sludges, which are not hydrophobic, using water-in-oil emulsions stabilized by cationic polymers. The U.S. Pat. No. 5,379,902 disclosed a method of using heavy oils in conjunction with two different types of surfactants, floating the coal-emulsion mixture, dewatering the flotation product and drying them for reconstitution. The U.S. Pat. No. 4,969,928 also teaches a method of using heavy oils for dewatering and reconstitution.

The U.S. Pat. No. 4,770,766 disclosed methods of increasing the hydrophobicity of oxidized and low-rank coals using additives during oil agglomeration. The main objective of this process is to improve the kinetics of agglomeration and ultimately the separation of hydrophilic mineral matter from coal. The additives disclosed in this invention include a variety of heavy oils and vegetable oils, alcohols containing 6 or more carbon atom, long-chain fatty acids, etc. When these additives were used, the product moisture was lower than would otherwise be the case. However, the process requires up to 300 lb/ton of additives and uses very large amounts (45 to 55% by volume of a coal to be cleaned) of an agglomerant, which is selected from butane, hexane, pentane and heptane.

The U.S. Pat. No. 5,458,786 disclosed a method of dewatering fine coal by displacing water from the surface with a very large amount of liquid butane. The spent butane is recovered and recycled. The U.S. Pat. No. 5,587,786 teaches methods of using liquid butane and other hydrophobic liquids for dewatering other hydrophobic particles.

A co-pending U.S. patent application, (whose filing number is not known at the time of filing the present application), discloses a method of improving dewatering fine particulate materials by hydrophobizing a fine particulate material using a suitable high HLB surfactant and then further enhancing its hydrophobicity using a well-defined nonionic surfactants of low HLB numbers. However, some of the reagents disclosed in this invention are costly.

OBJECTS OF THE INVENTION

It is an object of the present invention to provide novel methods of decreasing the moisture of fine particulate materials during mechanical dewatering processes such as vacuum and pressure filtration and centrifugation.

Another important objective of the invention is the provision of improving the rate at which water is removed so that given dewatering equipment can process higher tonnages of particulate materials.

An additional objective of the present invention is the provision of novel fine particle dewatering methods that can reduce the moisture so low that no thermal drying is necessary.

Still another object of the instant invention is the provision of a novel dewatering method that creates no adverse effects on up- and downstream processes when the water removed from the dewatering processes disclosed in the present invention is recycled.

Yet another object of the invention is the provision of methods of controlling the frothing properties of the flotation product.

Perhaps the most important object of the instant invention is to achieve all of the above objects using low-cost affordable dewatering aids that have no harmful effects on the environment and the human health.

SUMMARY OF THE INVENTION

It is the object of this invention to provide an efficient method of dewatering fine particulate materials. This is achieved by destabilizing the water on the surface of the particles to be dewatered by rendering the surface substantially hydrophobic. The particles are hydrophobized normally in two steps. Initially, surfactants of high hydrophile-liphophile balance (HLB) numbers are used to render a particulate material moderately hydrophobic. The material is subsequently treated with a lipid, which is a naturally occurring hydrophobic substance, to further enhance its hydrophobicity close to or above the water contact angle of 90°. This will greatly weaken the bonds between the water molecules and the surface of the particulate material and, thereby, 'liberate' the surface water. The liberated surface water is then removed from the particulate material by using various mechanical dewatering devices.

The key to the methods of dewatering described in the present invention disclosure is the hydrophobicity enhancement step. According to the Laplace equation, a relatively small increment in hydrophobicity (above the level that can normally be achieved using a high HLB surfactant in the first hydrophobization step) can bring about a large decrease in capillary pressure and, hence, a large decrease in surface moisture. The initial hydrophobization step may be omitted, if the particulate material is naturally hydrophobic or has been sufficiently hydrophobized in an upstream process, e.g., flotation, preceding dewatering. However, the particles must remain reasonably hydrophobic at the time of the hydrophobicity enhancement step. Otherwise, the dewatering aids added in this step does not adsorb on the surface and fails to enhance its hydrophobicity.

The lipids used in the second hydrophobization step of the instant invention are insoluble in water; therefore, they are used as solutions in appropriate solvents, which include but not limited to light hydrocarbon oils and short-chain alcohols. When used in conjunction with an appropriate solvent, lipid molecules may act as nonionic surfactants that can greatly enhance the hydrophobicity of the particulate material to be dewatered. Since lipids are naturally occurring reagents, their use offers a low cost means of improving mechanical dewatering processes.

The dewatering methods disclosed in the instant invention are capable of not only reducing the final cake moistures but also of increasing the kinetics of dewatering substantially. By virtue of the latter, the instant invention can greatly increase the throughput of a dewatering device. Furthermore, the dewatering aids of the present invention have the characteristics of anti-forming agents, which is very important for processing the particulate materials produced from flotation processes. Also, most of the reagents added as dewatering aids and blends thereof adsorb on the surfaces of minerals and coal so that the plant water does not contain significant amounts of residual reagents.

DETAILED DESCRIPTION OF THE INVENTION

The difficulty in removing water from the surface of fine particles may be attributed to the fact that water molecules are held strongly to the surface via hydrogen bonding. It is possible to break the bonds and remove the water by subjecting the wet particles to intense heat, high-pressure filters and high-G centrifuges. However, the use of such brute forces entails high energy costs and maintenance problems. A better solution would be to destabilize the surface water by appropriate chemical means, so that it can be more readily removed by using mechanical dewatering devices with minimum energy and maintenance requirements.

The state of the water adhering to a surface may be best represented by the hydrophobicity (water-hating property). The stronger the hydrophobicity, the weaker the bonds between the water and the surface. Therefore, the key to finding appropriate chemical means to destabilize surface water is to increase the hydrophobicity of the particles to be dewatered. A more traditional measure of surface hydrophobicity is water contact angle. In the cessile drop technique, contact angles are measured by placing droplets of water on the surface of the solids of interest. The contact angle, which is measured through the aqueous phase, increases with increasing hydrophobicity.

More recently, scientists developed methods of measuring the forces between two macroscopic surfaces approaching to each other in water. They discovered a hitherto unknown attractive force, which is generally referred to as hydrophobic force. Many researchers showed that the new attractive force is 10 to 100 times stronger than the omnipresent van der Waals force. Yoon and Ravishankar (J. Colloid and Interface Science, vol. 179, p. 391, 1996) showed that the hydrophobic force increases sharply when the contact angles of two interacting mica surfaces approach 90°. According to Eq. [1], capillary pressure becomes negative at contact angles above this value. Thus, if one can increase the hydrophobicity of a particulate material to the extent that its water contact angle exceeds 90°, water should be removed spontaneously. This may be achieved using appropriate surfactants. According to Flinn, et al. (Colloids and Surfaces A, vol. 87, p. 163, 1994), the hydrocarbon tails of octadecylchlorosilane begin to stand up vertically and form a close-packed monolayer on the surface of silica at a contact angle close to or above 90°. Also, Yoon and Ravishankar observed long-range hydrophobic forces only when close-packed monolayers were formed on mica surfaces. It appears, therefore, that the key to achieving spontaneous dewatering may be to find appropriate surfactants or combinations thereof that can form close-packed monolayers of hydrophobes on the surfaces of the particles to be dewatered.

In the instant invention, the particulate materials in a slurry are hydrophobized in two steps. In the first step, an appropriate surfactant is added to the slurry, so that it can adsorb on the surface of the particles and render them moderately hydrophobic. For hydrophilic particles such as silica and clay, ionic surfactants of high HLB numbers may be used for the initial hydrophobization. For sulfide minerals, short-chain thiols may be used. These reagents adsorb on the surface with their polar heads in contact with the surface and their hydrocarbon tails directed toward the aqueous phase. For naturally hydrophobic materials of moderate hydrophobicity, hydrocarbon oils and short-chain alcohols may be used to enhance the hydrophobicity. If the particles are sufficiently hydrophobic, no reagents may be necessary in the first hydrophobization step. In the second step, a lipid dissolved in an appropriate solvent or a mixture of solvents is added to the slurry to further increase the hydrophobicity of the particulate materials, so that the surface water can be removed more readily by mechanical dewatering processes of low energy consumption.

As a result of the first hydrophobization step, the contact angle of the particulate material to be dewatered may be increased to the range of 25° to 60°. It is difficult, but not impossible, to obtain contact angles above this range using a high HLB surfactant alone. High HLB surfactants and thiols adsorb only on specific surface sites. The population of the surface sites, at which the adsorption can occur, is usually well below what is needed to form a close-packed monolayer of the adsorbed surfactant molecules. The reagents added in the second hydrophobization step, i.e., the lipids dissolved in appropriate solvents, may adsorb in between the sparsely populated hydrocarbon tails of the high HLB surfactants and thiols, so that the surface is more fully covered by a close-packed monolayer of hydrophobes. This will increase the contact angle over 60° and more desirably close to or over 90°, so that water can be readily removed from the capillaries formed between finer particles.

Although the Laplace equation suggests that contact angle must exceed 90° for spontaneous dewatering, increasing contact angles close to but not exceeding this value can bring about sufficient advantages. A close examination of Eq. [1] reveals that an increase in contact angle beyond what can be achieved in the first hydrophobization step can bring about a substantial decrease in capillary pressure and, hence, a reduction in cake moisture. Consider a case where contact angle is increased from zero to 60° in the first hydrophobization step. This should decrease capillary pressure by only one half. If the angle is further increased from 60° to 85° in the second hydrophobization step, the capillary pressure decreases further by 5.7 times. This is a substantial gain that can be achieved by a seemingly a modest increment in contact angle. Thus, the second hydrophobization step disclosed in the instant invention offers a highly efficient means of substantially lowering capillary pressures and, thereby, achieving very low cake moistures. A co-pending U.S. Patent Application (whose number is not known at the time of the current application) filed by the inventor of the instant invention also discloses the advantages of incorporating a second hydrophobization step. In this co-pending application, well-defined low HLB surfactants are used as the hydrophobicity-enhancing reagent. However, many of the low HLB surfactants are considerably more expensive than the lipids disclosed in the instant invention.

Lipids are naturally occurring organic molecules that can be isolated from plant and animal cells (and tissues) by extraction with nonpolar organic solvents. Large parts of the molecules are hydrocarbons (or hydrophobes); therefore, they are insoluble in water but soluble in organic solvents such as ether, chloroform, benzene, or an alkane. Thus, the definition of lipids is based on the physical property (i.e., hydrophobicity and solubility) rather than by structure or chemical composition. Lipids include a wide variety of molecules of different structures, i.e., triacylglycerols, steroids, waxes, phospholipids, sphingolipids, terpenes, and carboxylic acids. They can be found in various vegetable oils (e.g., soybean oil, peanut oil, olive oil, linseed oil, sesame oil), fish oil, butter, lard and tallow. Animal fats and vegetable oils are the most widely occurring lipids. Although fats and oils appear different, that is, the former are solids and the latter are liquids at room temperature, their structures are closely related. Chemically, both are triacylglycerols; that is, triesters of glycerol with three long-chain carboxylic acids. They can be readily hydrolyzed to fatty acids. Corn oil, for example, can be hydrolyzed to obtain mixtures of fatty acids, which consists of 35% oleic acid, 45% linoleic acid and 10% palmitic acid. The hydrolysis products of olive oil, on the other hand, consist of 80% oleic acid. Waxes can also be hydrolyzed, while steroids cannot. Vegetable fats and oils are usually produced by expression and solvent extraction or a combination of the two. Pentane is widely used for solvent, and is capable of extracting 98% of soybean oil. Some of the impurities present in crude oil, such as free fatty acids and phospholipids, are removed from crude vegetable oils by alkali refining and precipitation. Animal oils are produced usually by rendering fats.

In the instant invention, the lipids may act as natural surfactants that can enhance the hydrophobicity of the particles to be dewatered. Each triacylglycerol, for example, consists of one head group, i.e., glycerol, and three hydrocarbon tails. For steroids, hydroxyl groups may act as polar head, while the ester linkages serve as the head groups with waxes. They may act effectively as nonionic surfactants of low hydrophile-lipophile balance (HLB) numbers. The HLB numbers of soybean oil and corn oil are 6 and 8, respectively, while that of castor oil is 14. They may adsorb in between or on top of the hydrocarbon chains of the surfactants and thiols that are present on the surface of fine particles as a result of the first hydrophobization step and, thereby, enhance the hydrophobicity.

Since the lipids have low HLB numbers, they may be used as solutions of appropriate solvents including but not limited to short-chain alcohols and light hydrocarbon oils. Typically, one part by volume of a lipid, which may be termed as active ingredient(s), is dissolved in two parts of a solvent before use. The two may be mixed in different ratios. As an example, three parts of an active ingredient may be mixed with one part of a solvent. In another, one part of an active ingredient may be mixed with 20 parts of a solvent.

The first hydrophobization step described above may be omitted, if a particulate material is naturally hydrophobic, or has acquired a moderate hydrophobicity in a process preceding dewatering step. For example, selected mineral (or coal) constituents of an ore (or coal) are selectively hydrophobized using appropriate reagents (e.g., high HLB surfactants, thiols, light hydrocarbon oils and short-chain alcohols) and floated away from hydrophilic mineral constituents as a means of separation and upgrading. The particulate material to be dewatered must be moderately hydrophobic for the second hydrophobization step disclosed in the instant invention to work. Otherwise, the hydrophobic lipids disclosed cannot adsorb on the surface via hydrophobic attraction and enhance its hydrophobicity. Frequently, the naturally hydrophobic materials or mineral concentrates become considerably less hydrophobic by the time they reach the dewatering step due to superficial oxidation, aging, or exposure to plant water containing hydrophilic polymers. In such cases, they may be re-hydrophobized using the high HLB surfactants and other reagents noted above before adding the reagents identified in the instant invention for the second hydrophobization step.

It may be useful to note here that mineral and coal concentrates obtained by flotation is not hydrophobic enough to be dewatered efficiently. The reason is that the thermodynamic requirement for bubble-particle adhesion, which is a prerequisite for flotation, is that contact angle be larger than zero, while the thermodynamic requirement for spontaneous dewatering is 90°, as discussed above. Therefore, the second hydrophobization step is essential to reduce the cake moisture beyond the levels usually achieved using the currently available dewatering aids and methods. The use of lipids in the second hydrophobization step provides a low-cost means of increasing the contact angle close to or above 90°.

For a given particulate material, parts of the surface must be more hydrophobic than the rest. When using a lipid as dewatering aid, most of the molecules may adsorb on the more hydrophobic parts of the surface, thereby increasing the packing density of hydrophobes on the surface and further increasing its hydrophobicity. The driving force for the adsorption mechanism may be one of hydrophobic attraction. On the other hand, some of the lipid molecules may adsorb on less hydrophobic parts of the surface, with the oxygens in the head groups in contact with the less hydrophobic parts of the surface, possibly via acid-base interactions, while the hydrocarbon tails are pointed toward the aqueous phase. The net result of this adsorption mechanism would be a conversion of the less hydrophobic parts of a surface to more hydrophobic ones. Both of these adsorption mechanisms, i.e., one based on hydrophobic interaction and the other based on acid-base interactions, should help increase the surface hydrophobicity substantially, with its contact angle approaching or exceeding 90°.

The light hydrocarbon oils used as solvents for lipids may also adsorb on the surface of the particulate material to be dewatered via hydrophobic interaction, and further enhance its hydrophobicity. In effect, the lipid molecules may act as nonionic surfactants and help spread the light hydrocarbon oils on the surface by modifying the interfacial tensions involved. The lipid molecules should increase the interfacial tension at the solid/water interface, as a consequence of rendering the surface more hydrophobic, while causing a decrease in the interfacial tensions at the oil/water and solid/oil interfaces. Improved spreading of the light hydrocarbon oil should contribute to enhancing the surface hydrophobicity close to or above 90°. Furthermore, all of the reagents used in the present invention may also serve as surface tension lowering agents. The surface tensions of the lipids, hydrocarbon oils and short-chain alcohols are substantially lower than that of water. Their presence at the air-water interface by virtue of their hydrophobicity should reduce the surface tension, and thereby help reduce cake moistures according to the Laplace equation.

Test Procedure

Many different samples were used for dewatering tests. These include fine silica, kaolin clay from middle Georgia (60% finer than 2 μm), various coal samples from different sources, and sulfide mineral concentrates. A hydrophilic material such as silica and kaolin was hydrophobized in two steps: first using a high HLB surfactant to render the surface moderately hydrophobic and then using a lipid to further enhance its hydrophobicity. Since lipids are insoluble in water, they were used after dissolution in suitable solvents. When sulfide mineral concentrates were received from abroad, they were superficially oxidized and became hydrophilic. As a means of regenerating fresh hydrophobic surfaces, they were re-floated using a thiol collector and methylisobutyl carbinol (MIBC) as a frother. This was necessary because lipids do not adsorb on hydrophilic surfaces.

Some of the coal samples were used as received. Most of the tests were conducted, however, after re-flotation using standard flotation reagents such as kerosene and MIBC. When a sample became hydrophilic due to aging or superficial oxidation during transportation, it was wet-ground in a ball mill for a short period of time to remove the oxidation products and regenerate fresh, moderately hydrophobic surfaces. Lipids adsorb on the surface and enhance its hydrophobicity. To minimize the problems concerning oxidation, some of the tests were conducted using coarse dense-medium products. They were crushed, pulverized, wet-ground in a ball mill, and floated using kerosene and MIBC. The float product was placed in a container and agitated. A known volume of the slurry was removed and transferred to an Elenmeyer flask. After adding known amounts of reagent (s), the flask was hand-shaken for 2 minutes. The conditioned slurry was poured into a filter to initiate a dewatering test. After a preset drying cycle time (usually 2 minutes), the product was removed from the filter, dried in an oven for overnight, and then weighed to determine the cake moisture. In each test, cake formation time and cake thickness were recorded. The cake formation time is defines as the time it takes for bulk of the water is drained and a cake is formed on a filter medium. For vacuum filtration, a 2.5-inch diameter Buchner funnel with a medium porosity glass frit was used. When it was desired to conduct tests at large cake thicknesses, the height of the Buchner filter was extended. For pressure filtration, a 2.5-inch diameter air pressure filter with a cloth fabric medium was used. It was made of Plexiglas so that the cake formation time could be determined by visual observation.

EXAMPLES

Example 1

A fine silica sample from Tennessee was wet-ground in a ball mill and screened to obtain a 0.074 mm×0 fraction. It was subjected to two sets of vacuum filtration tests, using varying amounts of a lipid (sunflower oil) with and without the first hydrophobization step. Dodecylammonium hydrochloride was used in the amount of 0.4 lb/ton at pH 9.5 for the initial hydrophobization. The sunflower oil was used as a 33.3% solution in diesel. All tests were conducted using a 2.5-inch diameter Buchner funnel at 0.45 inches of cake thickness, 2 minutes of drying cycle time, and a vacuum pressure of 25-inches Hg.

The control test conducted without any reagent gave 21.2% by weight of cake moisture and 104 seconds of cake formation time, as shown in Table 1. When the tests were conducted using sunflower oil without the initial hydrophobization step, both the moisture and the cake formation time decreased only slightly. These findings suggest that lipids do not adsorb on the hydrophilic silica surface and, therefore, cannot work as efficient dewatering aids. When test was conducted after the initial hydrophobization step but without the second hydrophobization step, the cake moisture was reduced to 15.3% and the cake formation time to 21 seconds.

When silica sample was hydrophobized in two stages as disclosed in the instant invention, substantial reductions in cake moisture were achieved. For example, the process involving an initial hydrophobization step of using 0.4 lb/ton of a high HLB surfactant (dodecylammonium hydrochloride) and a hydrophobicity-enhancement step of using 2 lb/ton sunflower oil reduced the cake moisture from 21.2% to 6.2% and the cake formation to from 104 seconds to 11 seconds.

TABLE 1

Effects of Using Sunflower Oil as a Dewatering Aid for the Filtration of a 0.074 mm × 0 Silica Sample at 25 in. Hg Vacuum Pressure

| Reagent | w/o 1st Hydrophobization Step | | w/1st Hydrophobization Step[1] | |
|---|---|---|---|---|
| Dosage (lb/ton) | Moisture Content (% wt) | Cake Form. Time (sec) | Moisture Content (% wt) | Cake Form. Time (sec) |
| 0 | 21.2 | 104 | 15.3 | 21 |
| 0.5 | 20.8 | 101 | 9.0 | 16 |
| 1 | 20.6 | 98 | 7.1 | 12 |
| 2 | 19.7 | 97 | 6.2 | 11 |

[1]with 0.4 lb/ton dodecylammonium hydrochloride

Tests were also conducted with a finer (0.034 mm×0) silica sample. A control test gave a cake of 26.4% and a cake formation time of 161 seconds. With a single-stage hydrophobization process of using 0.4 lb/ton of dodecylammonium chloride at pH 9.5, the cake moisture was reduced to 19.2% and the cake formation time to 26 seconds. With the two-stage hydrophobization process of using 0.4 lb/ton of the high HLB surfactant in the first stage and 2 lb/ton of a lipid (sunflower oil) in the second stage, the cake moisture was substantially reduced to 8.9% and the cake formation time to 11 seconds.

Example 2

High-brightness kaolin clays are produced by reverse flotation, i.e., colored impurities are hydrophobized by appropriate collectors and floated away from the clay which remain hydrophilic. The product is usually in the form of 25 to 35% solids, and is dewatered by vacuum filtration to obtain a cake containing 50–55% moisture. Part of the filter cake is thermally dried and then mixed with the remaining wet cake to further reduce the moisture to 25 to 30% range. In this example, a series of filtration tests were conducted on a Middle Georgia kaolin clay (60% finer than 2 μm) to demonstrate that the method of dewatering as described in the instant invention disclosure can dewater clay by vacuum filtration to a desired level without thermal drying. All tests were conducted using a 2.5-inch diameter Buchner funnel at 25 inches Hg, 0.16 inches cake thickness, and 3 min drying cycle time.

When test was conducted without any reagent, it was not possible to form a cake even after a long filtration time. When a test was conducted after hydrophobizing the clay with 1.4 lb/ton dodecylammonium hydrochloride at pH 9.3, the moisture was reduced to 32.3%. The cake formation time was 13.4 minutes. When the hydrophobicity was enhanced using varying amounts of sunflower oil, the moisture was further reduced as shown in Table 2. At 3 lb/ton sunflower oil, the moisture content was reduced to 22.4% and the cake formation time to 10.5 minutes. The lipid was used as a 33% solution in diesel oil.

TABLE 2

Effect of Using Sun Flower Oil on the Dewatering of a Middle Georgia Kaolin Clay

| Reagent Dosage (lb/ton) | Moisture Content (% wt) | Cake Form. Time (Min.) |
|---|---|---|
| 0 | 32.3 | 13.4 |
| 1 | 27.6 | 12.2 |
| 2 | 24.0 | 11.3 |
| 3 | 22.4 | 10.5 |

Example 3

A bituminous coal sample from Blackwater Mine, Australia, was subjected to a series of laboratory vacuum filtration tests. The sample was a flotation product and was received in the form of slurry. Since bituminous coals are naturally hydrophobic, the tests were conducted without the initial hydrophobization. However, the moisture reduction was relatively poor, most probably due to the superficial oxidation of the sample during transportation. As a means of removing the oxidation product from the surface and thereby restoring its hydrophobicity, the coal sample was wet-ground for 1.5 minutes and re-floated using a standard reagent package (i.e., 1 lb/ton of kerosene as collector and 0.2 lb/ton methylisobutylcarbinol (MIBC) as frother). The process of grinding and flotation may be considered to be the first hydrophobization step disclosed in the present invention.

The floatation product was then conditioned for two minutes with various reagents that can further increase its hydrophobicity and, thereby, improve dewatering. Three different reagents were used as hydrophobicity enhancing reagents and the results are compared. These include a vegetable lipid (soybean oil), diesel oil, and mixtures of the two. After the second hydrophobization step, the coal sample was subjected to a series of vacuum filtration tests using a 2.5-inch diameter Buchner funnel at 25 inches Hg vacuum pressure, 0.45-inch cake thickness, and 2 min drying cycle time. Table 3 compares the results. A control test, in which the second hydrophobization step was not employed, gave a cake moisture of 25.2%. Using 1 lb/ton of soybean oil in the second hydrophobization step, the moisture was reduced to 20.2%. At higher dosages of the reagent, no further improvement in moisture reduction was obtained. Use of diesel oil in the second hydrophobization step gave similar results. Using 1:2 mixtures of the two oils gave greater degrees of moisture reductions. In this case, the reagent dosages given in the first column of Table 3 refer to the dosages of soybean oil (active ingredient) alone rather than the sum of the two oils. One may suggest, therefore, that the performance of 1 lb/ton of the mixture should be compared with the performance of 3 lb/ton of soybean oil alone or diesel oil alone. Note, however, that the soybean oil-diesel oil mixtures outperformed either soybean oil or diesel oil individually even when they were compared on the basis of total amounts of the reagents used in the filtration experiments. For example, the use of 1 lb/ton soybean oil and 2 lb/ton diesel oil mixture gave 17.1% moisture, while 3 lb/ton of soybean oil alone and diesel oil alone gave 20.5 and 20.1% cake moistures, respectively. Thus, there exists a synergistic effect of using the mixture. The synergism increased with increasing reagent dosage. As shown in Table 3, continued increase in the dosages of soybean oil alone and diesel oil alone did not significantly decrease the cake moisture, while an increase in the dosages of the soybean oil-diesel oil mixtures substantially improved the moisture reduction. At 3 lb/ton soybean oil as an active ingredient, the cake moisture was reduced to as low as 14.3%. From a practical point of view, diesel oil is substantially cheaper than soybean oil; therefore, one may consider using the mineral oil as a low-cost facilitator, which can greatly enhance the performance of the lipid, i.e., soybean oil.

The reasons for the synergistic effect are not clear. It is possible that the triacylglycerols present in the soybean oil act as large surfactant molecules with one head group (glycerol) and three hydrocarbon tails. Since they are water insoluble, it will form large globules in water and would act as a hydrocarbon oil just like diesel oil. When soybean oil and diesel oil were used together, howerver, the latter serves as a solvent for triacylglycerols and help distribute them evenly on the surface of the coal particles. Triacylglycerols may adsorb on the surface of coal via hydrophobic interaction, and enhance its hydrophobicity. The contact angles may be increased close to or 90°, which is conducive to achieving high degrees of moisture reduction. Another possible explanation may be that the triacylglycerols present in soybean oil facilitate the spreading of diesel oil on coal. This can be achieved if the surfactant can reduce the interfacial tensions at the diesel oil/water and oil/coal interfaces, while increasing the interfacial tension at the solid/water interface. The net results of the two possible mechanisms are the same, that is, the hydrophobicity of coal increases by the combined use of a lipid of vegetable origin and a light hydrocarbon oil.

TABLE 3

Synergistic Effect of Using Soybean Oil and Diesel Oil for the Vacuum Filtration of a Blackwater Coal Sample (0.85 mm x 0)

| Reagent Addition | Moisture Content (% wt.) | | |
|---|---|---|---|
| (lb/ton) | Soybean Oil | Diesel Oil | Combination[1] |
| 0 | 25.8 | 25.8 | 25.8 |
| 1 | 20.2 | 22.5 | 17.1 |
| 2 | 19.6 | 20.8 | 15.5 |
| 3 | 20.5 | 20.1 | 14.3 |
| 5 | 21.5 | 19.7 | 13.7 |
| 7 | 20.9 | 19.9 | 14.4 |

[1]part soybean oil mixed with 2 parts of diesel oil by volume; The reagent dosages for the combination refer to soybean oil alone.

Example 4

A coarse Pittsburgh coal sample from a dense-medium separator was pulverized by means of a jaw crusher and a roll crusher, and then wet-ground in a ball mill. The advantage of using a freshly pulverized coal sample may be that the harmful effect of surface oxidation is minimized. The ball mill product was screened at 0.5 mm, and the screen underflow was floated using 1 lb/ton kerosene and 0.2 lb/ton MIBC. The process of flotation may be considered to be the first hydrophobization step disclosed in the instant invention. The product was subjected to a second hydrophobization step, in which a lipid (soybean oil) was used as a hydrophobicity-enhancing reagent. Since lipids are water insoluble, it may be beneficial to use them in conjunction with various solvents. In this example, several light hydrocarbon oils and a short-chain alcohol were used as solvents. The filtration tests were conducted using a 2.5-inch vacuum filter at 0.45-inch cake thickness, 2-minute drying cycle time, and 25-inch cake thickness. The results are given in Table 4. With the particular coal sample used in this example, mineral oils gave better results than butanol. Soybean oil dissolves better in the former. On the other hand, butanol is water-soluble, while mineral oils are not. Therefore, it is not clear what makes a better solvent for soybean oil.

TABLE 4

Effects of Using Soybean Oil as a Dewatering Aid in Various Solvents on the Vacuum Filtration of a Pittsburgh Coal Sample (0.5 mm × 0)

| Reagent | Cake Moisture (% wt) | | | | |
|---|---|---|---|---|---|
| Dosage (lbs/ton) | Diesel Oil | Kerosene | Fuel Oil No. 4 | Gasoline | Butanol |
| 0 | 25.1 | 25.1 | 25.1 | 25.1 | 25.1 |
| 1 | 16.8 | 17.0 | 17.5 | 17.6 | 19.8 |
| 3 | 14.3 | 14.4 | 15.4 | 16.1 | 18.6 |
| 5 | 13.7 | 13.5 | 14.7 | 14.8 | 17.1 |

Example 5

A floatation product from Peak Downs Mine, Australia, was received in the form of slurry. The sample was superficially oxidized during transportation. It was, therefore, wet-ground in a ball mill for 1.5 minutes and re-floated using 1 lb/ton of kerosene and 0.2 lb/ton MIBC. The flotation product was conditioned with a lipid of animal origin (fish oil) to enhance its hydrophobicity. The lipid was used as a 33.3% solution in diesel oil. The conditioned coal sample was subjected to a series of filtration tests at 200 kPa air pressure and 2 min drying cycle time. The results are given Table 5. At 0.25-inch cake thickness and 5 lb/ton fish oil, the moisture was reduced from 3.4 to 9.4%, which represents a 59.8% moisture reduction. At lower reagent dosages and higher cake thicknesses, the moisture reduction became less substantial.

TABLE 5

Effects of Using Fish Oil on the Filtration of a Coal Sample (0.6 mm × 0) from the Peak Downs Mine, Australia, at 200 kPa of Air Pressure

| Reagent Addition | Moisture Content (% wt.) Cake Thickness (inch) | | |
|---|---|---|---|
| (lb/ton) | 0.25 | 0.50 | 0.85 |
| 0 | 23.4 | 25.8 | 26.7 |
| 1 | 14.8 | 16.2 | 18.8 |
| 3 | 10.1 | 13.7 | 17.2 |
| 5 | 9.4 | 12.4 | 15.6 |

Example 6

Table 6 shows the results of the vacuum filtration tests conducted on a Pittsburgh coal sample using fish oil as a dewatering aid. It was used as a 1:2 mixture by volume with diesel oil. The coal sample was a dense-medium product, which was pulverized, ball-mill ground and screened at 0.5 mm. The screen underflow was floated using 1 lb/ton kerosene and 0.2 lb/ton MIBC before filtration. The filtration tests were conducted using a 2.5-inches diameter Buchner funnel at 25-inches Hg of vacuum pressure and 0.45 inches of cake thickness. At 3 lb/ton of fish oil, moisture was reduced from 28.2 to 15.4%.

Also shown in the table are the equlibrium contact angles of the Pittsburgh coal sample treated under different reagent conditions. In the absence of any reagent, the coal sample gave a contact angle of 12° only, which should give rise to a relatively high capillary pressures and, hence, a high cake moisture. At 1 lb/ton kerosene, contact angle increased to 44°. According to the Laplace equation, the increase in contact angle from 12° to 44° should reduce the capillary pressure by 1.36 time, which may be responsible for the modest reduction in cake moisture from 28.2 to 24.9%. These results may be considered to be the consequence of the first hydrophobization step disclosed in the instant invention. In the presence of fish oil, contact angle increased close to 90° as shown in Table 6. At 2 lb/ton, it increased to 86°, which should reduce the capillary pressure by 14 times as compared to the case of untreated coal. Such a large decrease in capillary pressure may be responsible for the substantial decrease in moisture from 28.2 to 16.2%. The results obtained after conditioning with fish oil may be considered to be the consequence of the second hydrophobization step disclosed in the instant invention. Table 6 also shows the surface tensions of the filtrates. The decrease in surface tension with increasing reagent addition may be another factor in the observed decrease in cake moisture.

TABLE 6

Effects of Kerosene and Fish Oil on the Contact Angle of a Pittsburgh Coal Sample, Filtrate Surface Tension, and the Final Cake Moisture

| Reagents Added | Reagent Dosages (lb/ton) | Contact Angle (Degree) | Filtrate Surface Tension (mN/m) | Moisture Content (% wt) |
|---|---|---|---|---|
| None | 0 | 12 | 71 | 28.2 |
| Kerosene | 1 | 44 | 69 | 24.9 |
| Fish Oil | 1 | 73 | 65 | 18.4 |
| | 2 | 86 | 62 | 16.2 |
| | 3 | 89 | 63 | 15.4 |
| | 5 | 91 | 56 | 15.5 |

Example 7

The various lipids of vegetable and animal origins should work with any moderately hydrophobic solid. Therefore, filtration tests were conducted on a zinc (sphalerite) concentrate (0.105 mm×0) obtained by flotation. The sample was received from a zinc mine in Europe. It was found, however, that the sample was superficially oxidized when it was delivered. Therefore, the sample was re-floated using 0.1 lb/ton sodium isopropyl xanthate and 0.15 lb/ton MIBC as a means of regenerating fresh, hydrophobic surface. The filtration tests were conducted using a 2.5-inch diameter pressure filter at 100 kPa air pressure and 2 min drying cycle time. The tests were conducted at various dosages of a lipid (fish oil) and cake thicknesses. One part by volume of fish oil was mixed with 2 parts of diesel oil before use. At 3 lb/ton fish oil, the moisture reductions were 46, 43 and 41% at 0.2, 0.3 and 0.6 inches of cake thicknesses, respectively. At 5 lb/ton, the moisture reductions did not improve significantly further.

TABLE 7

Effects of Using Fish Oil for the Filtration of a Zinc Concentrate at 100 kPa of Air Pressure

| Reagent Dosage | Moisture Content (% wt.) Cake Thickness (inch) | | |
|---|---|---|---|
| (lbs/ton) | 0.2 | 0.3 | 0.6 |
| 0 | 13.7 | 14.6 | 17.3 |
| 1 | 8.7 | 9.5 | 11.8 |
| 3 | 7.4 | 8.3 | 10.2 |
| 5 | 7.6 | 8.2 | 9.8 |

Example 8

As another example, soybean oil was used as dewatering aid for copper (chalcopyrite) concentrate (150 mm×0). The lipid was used as a 33.3% solution in diesel oil. The sample was a flotation product, which was superficially oxidized during transportation. As a means of regenerating hydrophobic surfaces, the sample was wet-ground in a ball mill and re-floated using 0.1 lb/ton sodium isopropyl xanthate and 50 g/ton MIBC. The flotation product was subjected to vacuum filtration tests using a 2.5-inch Buchner funnel at 25-inches Hg and 2 min drying cycle time. The % moisture reductions were 55, 43, and 43.4% at 0.15, 0.3 and 0.6 inches of cake thickness, respectively. Reagent additions above 3 lb/ton did not significantly further the moisture reduction. These results are comparable to those obtained in the plant using a high-pressure filter followed by a thermal dryer.

TABLE 8

Effects of Using Soybean Oil for the Vacuum Filtration of a Copper Concentrate

| Reagent Dosage | Moisture Content (% wt) Cake Thickness (inch) | | |
|---|---|---|---|
| (lb/ton) | 0.15 | 0.30 | 0.60 |
| 0 | 9.8 | 10.7 | 12.2 |
| 1 | 5.7 | 6.7 | 8.3 |
| 2 | 4.9 | 6.4 | 7.2 |
| 3 | 4.4 | 6.1 | 6.9 |
| 5 | 4.1 | 5.8 | 6.7 |

Example 9

Table 9 shows a set of vacuum filtration tests conducted on a bituminous coal sample (0.6 mm×0) from Elkview Mine, British Columbia, Canada. The sample was received in the form of slurry and used as received. The tests were conducted using a 2.5-inch diameter Buchner funnel at 25 inches Hg of vacuum pressure with 2 min drying cycle time and 0.4 inches of cake thickness. Three different vegetable oils were used as dewatering aids, and the results are compared. These oils were used as 10% solutions in butanol. Both sesame oil and peanut oil reduced the cake moisture by nearly 50% at 2 lb/ton of reagent addition.

TABLE 9

Effects of Using Different Vegetable Oils for the Vacuum Filtration of Elkview Coal

| Reagent Addition | Moisture Content (% wt.) | | |
|---|---|---|---|
| (lb/ton) | Sesame Oil | Peanut Oil | Corn Oil |
| 0 | 24.4 | 24.4 | 24.4 |
| 0.5 | 14.1 | 14.4 | 15.6 |
| 1 | 13.3 | 13.5 | 15.8 |
| 2 | 12.0 | 12.6 | 14.6 |
| 3 | 11.9 | 11.9 | 14.2 |

Example 10

A floatation (0.85 mm×0) from Massey Coal Company, West Virginia, was used for filtration tests, in which a 2.5-inch diameter pressure filter was used at 200 kPa air pressure and 2 min drying cycle time. The coal sample was wet-ground in a ball mill for 1.5 minutes and re-floated using 1 lb/ton kerosene and 0.2 lb/ton MIBC. Varying amounts of coconut oil were used at different thicknesses. It was used as a 1:2 mixture with diesel oil. The moisture reductions were 64.7, 58.5, and 51.2% at 0.2, 0.4 and 0.8 inches cake thicknesses, respectively.

TABLE 10

Effects of Using Coconut Oil for the Filtration of a Bituminous Coal at 200 kPa of air Pressure

| Reagent Addition | Moisture Content (% wt.) Cake Thickness (inch) | | |
|---|---|---|---|
| (lb/ton) | 0.2 | 0.4 | 0.8 |
| 0 | 21.8 | 23.4 | 24.8 |
| 1 | 12.4 | 14.2 | 16.2 |
| 2 | 10.1 | 11.9 | 14.5 |
| 3 | 9.0 | 10.4 | 12.8 |
| 5 | 7.7 | 9.7 | 12.1 |

Example 11

The dewatering aids disclosed in the present invention works well with hydrophobic particles. Talc is naturally hydrophobic mineral that is used for a variety of applications including paper coating and removal of sticky materials from wood pulp. Table 11 shows the results obtained in series of filtration tests conducted using sunflower oil as a dewatering aid. The reagent was used as a 33.3% solution in diesel oil. The tests were conducted using a 2.5-inch diameter filter at 200 kPa air pressure and 2 min drying cycle time. The sample was received from Luzenac America, and was floated using 0.2 lb/ton MIBC just before filtration. Better than 50% moisture reductions were achieved at 0.2 and 0.4 inches cake thickness. At 0.8-inch cake thickness, the moisture was reduced from 28.4% to 16.3% using 5 lb/ton sunflower oil.

TABLE 11

Effects of Using Sun Flower Oil for the Filtration of a Talc (0.15 mm × 0) Sample at 200 kPa of Air Pressure

| Reagent Dosage | Moisture Content (% wt) Cake Thickness (inch) | | |
|---|---|---|---|
| (lbs/ton) | 0.2 | 0.4 | 0.8 |
| 0 | 25.2 | 26.9 | 28.4 |
| 1 | 14.2 | 17.3 | 18.9 |
| 3 | 12.6 | 14.7 | 17.5 |
| 5 | 11.8 | 13.4 | 16.3 |

Example 12

In this example, a clean spiral product was wet-ground in a ball mill. The fines fraction (0.85 mm×0) was floated using 1 lb/ton kerosene and 0.2 lb/ton MIBC as a means of initial hydrophobization. The hydrophobicity of the flotation product was enhanced using a lipid of animal origin (lard) and then subjected to filtration tests. Two sets of tests were conducted at 100 and 200 kPa of air pressures. Varying amounts of the lipid were used as 25% solutions in diesel oil. The tests were conducted using a 2.5-inch diameter filter at 2 min drying cycle time. As shown in Table 12, lard oil works well as a dewatering aid. The moisture reduction improves with increasing reagent dosage and air pressure. Moisture reductions of 50 to 60% were obtained at lower cake thicknesses and at the higher air pressure. Even at the thicker cake, moisture reductions approaching 50% were obtained at higher reagent dosages.

TABLE 12

Effects of Using Lard Oil for the Filtration of a 0.85 mm × 0 Massy Coal Sample at 100 and 200 kPa of Air Pressures

| Applied Pressure | Reagent Addition | Moisture Content (% wt.) Cake Thickness (inch) | | |
|---|---|---|---|---|
| (kPa) | (lb./ton) | 0.2 | 0.4 | 0.8 |
| 100 | 0 | 24.6 | 26.4 | 27.1 |
|  | 1 | 14.0 | 16.3 | 19.1 |
|  | 3 | 12.3 | 14.1 | 15.2 |
| 200 | 0 | 22.4 | 24.1 | 25.4 |
|  | 1 | 10.8 | 12.6 | 14.3 |
|  | 3 | 8.7 | 10.8 | 12.8 |

Example 13

In this example, one part by volume of sunflower oil was blended with one part of sorbitan monooleate (Span 80) and four parts of diesel oil and used as dewatering aid. The HLB number of sorbitan monooleate is 4.3; therefore, it blends well with the other two components. Dewatering tests were conducted on a bituminous coal sample from Massey Coal Company, West Virgina. It was a dense-medium product, which was crushed, ground, and screened to obtain 0.6 mm×0 fraction, which was floated using 1 lb/ton kerosene and 100 g/ton MIBC. Dewatering tests were conducted using a 2.5-inch diameter pressure filter at 150 kPa air pressure at 2 min drying cycle time and 0.5 inches cake thickness. The tests were conducted by varying the reagent dosage.

The results obtained with the sunflower oil-sorbitan monooleate blend were compared with those obtained with its individual components. Sunflower oil gave considerably inferior results to those obtained with sorbitan monooleate. However, the results obtained with a blend of the two were comparable to those obtained with sorbitan monooleate. This finding suggest that blending an appropriate lipid and a low HLB surfactant provides a means of reducing reagent cost, because the former is cheaper than the latter.

TABLE 13

Effects of using a Sunflower Oil-Sorbitan Monooleate Blend for the Filtration of a Bituminous Coal Sample at 150 kPa Air Pressure

| Reagent Addition (lb/ton) | Moisture Content (% wt) | | |
|---|---|---|---|
|  | Sunflower Oil | Sorbitan Monooleate | Combination |
| 0 | 25.7 | 25.7 | 25.7 |
| 1 | 16.2 | 13.4 | 13.0 |
| 2 | 14.2 | 10.3 | 10.4 |
| 3 | 12.0 | 9.5 | 9.3 |
| 5 | 11.7 | 9.0 | 8.7 |

Example 14

Although results obtained using the dewatering aids disclosed in the present invention produced results far superior to those obtainable using conventional dewatering aids, their effectiveness decrease with increasing cake thickness. This is probably a reflection of the difficulty in transporting the water molecules liberated by the dewatering aids disclosed in the instant invention through filter cake. One solution to the problem may be to apply a mechanical vibration to the filter cake during drying cycle time. Table 14 shows the results obtained with and without using vibration when sunflower oil was used as dewatering aid for the filtration of a coal sample (0.6 mm×0) from Virginia. The reagent was used as a 33.3% solution in diesel oil. The coal sample was a dense-medium product, which was crushed, ground floated using 1 lb/ton kerosend and 0.2 lb/ton MIBC. The filtration experiments were conducted using a 2.5-inch diameter Buchner funnel at 25-inch Hg vacuum pressure. An ultrasonic probe was placed at the conical part of the Buchner funnel during the 5 minute drying cycle time. When the vibration was applied without the dewatering aid, the cake moisture was reduced from 22.6 to 19.2%. When 2 lb/ton of the dewatering aid was used in conjunction with the vibration, the cake moisture was reduced to 9.2% at 0.4-inch cake thickness. At 5 lb/ton, the moisture was reduced to as low as 7.7%.

TABLE 14

Effects of Vibration on the Filtration of a Virginia Coal Using Sunflower Oil as a Dewatering Aid

| Reagent Addition (lb/ton) | Cake Moisture (% wt.) Cake Thickness (inches) | | | |
|---|---|---|---|---|
|  | 0.2 | | 0.4 | |
|  | w/o Vibration | w/ Vibration | w/o Vibration | w/ Vibration |
| 0 | 19.6 | 16.1 | 22.6 | 19.2 |
| 1 | 12.5 | 10.7 | 14.3 | 10.7 |
| 2 | 10.2 | 7.3 | 12.6 | 9.2 |
| 3 | 9.6 | 6.0 | 12.0 | 8.3 |
| 5 | 8.2 | 4.8 | 11.7 | 7.7 |

Example 15

Various are used to lower the surface tension of the water that is to be removed by filtration. According to the Laplace equation, this should reduce the pressure of the water trappped in the capillaries present in a filter cake and, hence, help reduce the residual cake moisture. It should be, noted, however, that bulk of the water is removed easily during the cake formation time or through the larger capillaries present in the cake. In this regard, the amount of the reagent dissolved in the portion of the water that is easily removed may be considered to be a waste. It would be more economical to add the reagent after a cake has been formed. This will serve as a means of the reagent when it is really needed.

In this example, a series of dewatering tests were performed by spraying butanol directly on to a filter cake. Approximately 2 lb/ton of the reagent was added immediately after cake formation time. The surface tension of butanol is 20.6 mN/m at 20° C., which is much lower than that of water. Therefore, the of butanol may be to reduce the surface tension of the water trapped in the finer capillaries. The coal sample used in this example was a Middle Fork dense-medium product, which was crushed, ground, and floated using 1 lb/kerosene and 0.15 lb/ton MIBC. The flotation product was conditioned with varying amounts of a lipid (sunflower oil) prior to filtration. The filtration tests were conducted using a 2.5-inch diameter Buchner funnel at 25-inch Hg vacuum pressure, 2-min drying cycle time, and 0.45-inch cake thickness. As shown in Table 15, the spray technique reduced the cake moisture by 4 to 5% beyond what can be achieved using the lipid as a hydrophobicity-enhancing reagent. Thus, the technique of using lipids and butanol spray provides a means of achieving deep moisture reductions. Any other surface tension lowering reagents may be sprayed in place of the butanol used in this example. One should be careful, however, not to use the surfactants that can dampen the hydrophobicity of the particles to be dewatered.

TABLE 15

Effects of Combining the Techniques of Using Sunflower Oil and Butanol Spray to Achieve Deep Moisture Reductions at 0.45-inch Cake Thickness

| Reagent Dosage | Moisture Content (% wt) | |
| --- | --- | --- |
| (lb/ton) | w/o Spray | w/Spray |
| 0 | 22.2 | 18.0 |
| 1 | 15.3 | 11.2 |
| 2 | 13.2 | 9.4 |
| 3 | 12.7 | 8.3 |
| 5 | 12.5 | 7.6 |

Example 16

It is the objective of the present example to demonstrate that combining the methods of using a lipid to enhance the hydrophobicity and of spraying butanol to lower he surface tension can achieve deep moisture reductions at a large cake thickness. Vacuum filtration tests were conducted on a bituminous coal sample from Massey Coal Company, West Virginia, at a 1.4-inch cake thickness. The coal sample was a dense-medium product, which was crushed, ground, and screened to obtained a 0.6 mm×0 fraction. The screen underflow was floated using 1 lb/ton kerosene and 0.15 lb/ton MIBC. The filtration tests were conducted using a 2.5-inch diameter Buchner funnel with a 6.5-inch height at a 25-inch Hg vacuum pressure and 2-min drying cycle time. The control test, which was conducted on the flotation product without lipid and butanol spray, gave 25.8% cake moisture as shown in Table 16. At 3 lb/ton sunflower oil and 2 lb/ton butanol spray, the cake moisture was reduced from 25.8 to 13%.

TABLE 16

Effects of combining the Techniques of Using Sunflower Oil and Butanol Spray to Achieve Deep Moisture Reductions at 1.4-inch Cake Thickness

| Reagent Dosage | Moisture Content (% wt) | |
| --- | --- | --- |
| (lbs/ton) | No Spray | Butanol Spray |
| 0 | 25.8 | 22.5 |
| 1 | 19.6 | 16.5 |
| 2 | 17.4 | 14.2 |
| 3 | 16.5 | 13.0 |
| 5 | 15.8 | 12.7 |

Example 17

A rather surprising observation was made when aluminum ($Al^{3+}$) ions were used in conjunction with the dewatering aids disclosed in the present invention. It has been found that in the presence of the well-known coagulant for negatively charged particles, the amounts of lipids required to achieve desired cake moistures were substantially reduced. The second and third columns of Table 17 compare the results obtained with and without using $Al^{3+}$ ions before filtration. In each experiment, a coal slurry was conditioned in the presence of 0.02 lb/ton aluminum chloride for 2 minutes before adding a desired amount of sunflower oil. The coal sample was a dense-medium product from the Middle Fork coal preparation plant, Virginia. It was crushed, ground, and screened to obtain a 0.6 mm×0 fraction, which was floated using 1 lb/ton kerosene and 0.2 lb/ton MIBC. The flotation product was filtered using a 2.5-inch diameter Buchner filter at 0.67-inch cake thickness and 5 min drying cycle time. As shown, the cake moisture obtained using both $Al^{3+}$ ions and a lipid (sunflower oil) are much lower than the case of using the latter alone. Consequently, the amount of sunflower oil needed to achieve a given level of cake moisture was reduced substantially in the presence of $Al^{3+}$ ions. For example, 5 lb/ton of sunflower oil was needed to achieve 12.3% cake moisture in the absence of $Al^{3+}$ ions. In the presence of $Al^{3+}$ ions, however, only 0.5 lb/ton sunflower oil was needed to achieve a 12.6% cake moisture. When 2 lb/ton butanol was sprayed, dewatering became even more effective: The amount of sunflower oil needed to achieve a 12.3% cake moisture was further reduced to 0.25 lb/ton, as shown in the third column of Table 16.

Dewatering became even more efficient when filter cake was vibrated during the 5 min drying cycle time. As shown in the last column of Table 17, the cake moisture was reduced to 10.3% at 0.25 lb/ton sunflower oil. At higher dosages of sunflower oil, single digit cake moistures were obtained. Thus, proper combinations of: i) using the dewatering aids disclosed in the present invention, ii) conditioning the slurry with trivalent (or divalent) cations, iii) spraying appropriate surface tension lowering agent(s) during drying cycle time, and iv) applying mechanical vibration during drying cycle time, can help achieve deep levels of moisture reduction using small amounts of lipids as dewatering aids.

TABLE 17

Effects of Combining the Techniques of Using Sunflower Oil, $Al^{3+}$ Ions, Butanol Spray, and Vibration to Achieve Deep Moisture Reductions at a 0.67-inch Cake Thickness

| Reagent Addition (lb./ton) | Cake Moisture (% wt.) | | | |
|---|---|---|---|---|
| | None | $Al^{3+}$ Ion | $Al^{3+}$ ions and Butanol Spray | $Al^{3+}$ ions, Butanol Spray and Vibration |
| 0 | 23.8 | 20.4 | 18.8 | 17.0 |
| 0.25 | 17.1 | 14.3 | 12.3 | 10.4 |
| 0.5 | 16.3 | 12.6 | 10.7 | 8.7 |
| 1 | 14.4 | 11.7 | 9.5 | 7.5 |
| 2 | 13.7 | 11.2 | 9.1 | 7.1 |
| 3 | 13.1 | 10.9 | 8.8 | 6.8 |
| 5 | 12.3 | 10.8 | 8.5 | 6.2 |

I claim:

1. A process for dewatering a slurry of fine particulate material comprising:
   i) rendering the material hydrophobic,
   ii) adding lipids dissolved in organic solvent,
   iii) agitating the slurry to allow for the lipid molecules to adsorb on the surface of the hydrophobized material so that its hydrophobicity is increased, and
   iv) subjecting the slurry containing the particulate material, whose water contact angle has now been increased, to a mechanical method of dewatering, so that the moisture of the particulate material is reduced.

2. The process of claim 1 wherein the fine particulate material is smaller than 2 mm in diameter.

3. The process of claim 1 wherein the initial hydrophobization is achieved using surfactants and collectors.

4. The process of claim 3 wherein the surfactants are high HBL surfactants, whose polar heads can interact with the surface of the particulate materials.

5. The process of claim 3 wherein the collectors are thiols for sulfide minerals and metals.

6. The process of claim 3 wherein the collectors are hydrocarbon oils when the particulate material is coal and other non-polar substances.

7. The process of claim 1 wherein the initial hydrophobization step is omitted when the particulate material is non-polar.

8. The process of claim 1 wherein the initial hydrophobization step involves creating fresh surfaces by comminution, when the particulate material to be dewatered is non-polar.

9. The process of claim 1 wherein the initial hydrophobization step is employed when the surface of the particulate material to be dewatered has become less hydrophobic due to superficial oxidation.

10. The process of claim 1 wherein the initial hydrophobization step renders the surface of the particulate material hydrophobic so that its water contact angle is less than 90°.

11. The process of claim 1 wherein said mechanical means is filtration.

12. The process of claim 1 wherein the lipid are of vegetable origin.

13. The process of claim 1 wherein a hydrophobicity-enhancing reagent disclosed in claim 10 is blended with a nonionic surfactant of hydophile-lipophile balance number of less than 15.

14. The process of claim 1 wherein the solvent is selected from light hydrocarbon oils of less than eight carbons, short-chain alcohols, and ethers.

15. The process of claim 1 wherein the initial hydrophobization step is omitted when the particulate material has become hydrophobic in an upstream process.

16. The process of claim 15 wherein the upstream processes is conditioning, in which surfactants and collectors, including those that are used for flotation, are contacted with the particulate material.

17. The process of claim 15 wherein the upstream process is floatation.

18. The process of claim 1 wherein the mechanical method is performed by centrifugation.

19. The process of claim 1 wherein the lipid is of animal origin including fish.

20. A process for dewatering a slurry of fine particulate material comprising:
   i) rendering the material hydrophobic,
   ii) adding an inorganic electrolyte,
   iii) adding a lipid dissolved in an organic solvent,
   iv) agitating the slurry to allow for the lipid molecules to adsorb on the surface of the hydrophobized particulate material so that its hydrophobicity is increased, and
   v) subjecting the slurry containing the particles, whose water contact angle has now been increased, to a mechanical method of dewatering,
so that the amount of the lipids required to achieve a requisite moisture content of the particulate material is reduced.

21. The process of claim 20 wherein the inorganic electrolytes is selected from salts of monovalent, divalent and trivalent cations and anions.

22. The process of claim 20 wherein the electrolytes are the salts of aluminum ions.

23. The process of claim 20 wherein the fine particulate material is smaller than 2 mm in diameter.

24. The process of claim 20 wherein the initial hydrophobizing step is achieved using surfactants and collectors, including those that are used for floatation.

25. The process of claim 20 wherein the lipid is selected from those of vegetable and animal origins including fish.

26. The process of claim 20 wherein the initial hydrophobization step is omitted when the particulate material is non-polar.

27. The process of claim 20 wherein the initial hydrophobization step is omitted when the particulate material has become hydrophobic in an upstream process.

28. The process of claim 20 wherein the solvent is selected from light hydrocarbon oils of less than eight carbons, short-chain alcohols and ethers.

29. A process for dewatering a slurry of fine particulate material comprising:
   i) rendering the material hydrophobic,
   ii) adding a lipid in organic solvent,
   iii) agitating the slurry to allow for the lipid molecules to adsorb on the surface of the hydrophobized particulate material so that its hydrophobicity is enhanced, and
   iv) subjecting the conditioned slurry containing the particulate material, whose water contact angle has now been increased, to a vibratory means,
so that an increased moisture reduction is achieved at a given cake thickness.

30. The process of claim 29 wherein said vibratory means is selected from ultrasonic, mechanical and acoustic means.

31. The process of claim 29 wherein the particle sizes are smaller than 2 mm.

32. The process of claim 29 wherein the initial hydrophobization is achieved using surfactants and collectors, including those that are used for floatation.

33. The process of claim 29 wherein said lipid is selected from those of vegetable and animal origins.

34. The process of claim 29 wherein the initial hydrophobization step is omitted when the particulate material is non-polar.

35. The process of claim 29 wherein the initial hydrophobization step is omitted when the particulate material has become hydrophobic in an upstream process.

36. The process of claim 29 wherein the solvent is selected from light hydrocarbon oils of less than eight carbons, short-chain alcohols and ethers.

37. A process for dewatering a slurry of fine particulate material comprising:
   i) rendering the material hydrophobic,
   ii) adding a lipid dissolved in organic solvent,
   iii) agitating the slurry to allow for the lipid molecules to adsorb on the surface of the hydrophobized particulate material so that its hydrophobicity is increased, and
   iv) subjecting the conditioned slurry containing the particulate material, whose water contact angle has now been increased, to a filtration process in which a surface tension lowering reagent is added to the filter cake in the form of fine spray,
so that an increased moisture reduction is achieved at a given cake thickness.

38. The process of claim 37 wherein the suitable surface tension lowering agent is selected from short-chain alcohols, light hydrocarbon oils of less than eight carbons, and appropriate surfactants.

39. The process of claim 37 wherein the particle sizes are less than 2 mm.

40. The process of claim 37 wherein the initial hydrophobization step is achieved using surfactants and collectors, including those that are used for floatation.

41. The process of claim 37 wherein said lipid is selected from those of vegetable and animal origins.

42. The process of claim 37 wherein the initial hydrophobization step is omitted when the particulate material is non-polar.

43. The process of claim 37 wherein the initial hydrophobization step is omitted when the particulate material has become hydrophobic in an upstream process.

44. The process of claim 37 wherein the solvent is selected from light hydrocarbon oils of less than eight carbons, short-chain alcohols aid ethers.

45. A process for dewatering a slurry of fine particulate material comprising:
   i) rendering the material hydrophobic,
   ii) adding an inorganic electrolyte to the slurry,
   iii) adding a lipid dissolved in an organic solvent,
   iv) agitating the slurry to allow for the lipid molecules to adsorb on the surface of the hydrophobized particulate material so that its hydrophobicity is increased, and
   v) subjecting the conditioned slurry containing the particulate material, whose water contact angle has now been increased, to a filtration process in which a surface tension lowering reagent is added to the filter cake in the form of fine spray while the filter cake is subjected to a vibratory means,
so that an increased moisture reduction is achieved using less reagents.

46. The process of claim 45 wherein the range of particle sizes is less than 2 mm.

47. The process of claim 45 wherein the initial hydrophobization is achieved using surfactants and collectors including those that are used for floatation.

48. The process of claim 45 wherein said lipid is selected from those of vegetable and animal origins.

49. The process of claim 45 wherein the initial hydrophobization step is omitted when the particulate material is non-polar.

50. The process of claim 45 wherein the initial hydrophobization step is omitted when the particulate material has become hydrophobic in an upstream process.

51. The process of claim 45 wherein the solvent is selected from light hydrocarbon oils of less than eight carbons, short chain alcohols and ethers.

* * * * *